US006935132B1

(12) United States Patent
Urch

(10) Patent No.: US 6,935,132 B1
(45) Date of Patent: Aug. 30, 2005

(54) AIR CONDITIONING APPARATUS

(76) Inventor: John Francis Urch, 5 Mario Road, Cornulla, New South Wales 2230 (AU)

( * ) Notice: Subject to any disclaimer, the term of this patent is extended or adjusted under 35 U.S.C. 154(b) by 0 days.

(21) Appl. No.: 10/943,031

(22) Filed: Sep. 16, 2004

(51) Int. Cl.7 .............................................. F25B 13/00
(52) U.S. Cl. ............................ 62/324.1; 62/91; 62/304
(58) Field of Search ............................ 62/91, 95, 304, 62/310, 324.1; 165/104.34

(56) References Cited

U.S. PATENT DOCUMENTS 4,771,611 A * 9/1988 McNab .......................... 62/311
5,353,606 A * 10/1994 Yoho et al. .................... 62/271
6,311,511 B1 * 11/2001 Maeda ........................... 62/271
6,385,987 B2 * 5/2002 Schlom et al. ................. 62/304

* cited by examiner

Primary Examiner—Melvin Jones
(74) Attorney, Agent, or Firm—Fitch, Even, Tabin & Flannery

(57) ABSTRACT

An air conditioning apparatus (10/30) that has an enthalpy or sensible heat exchanger (22/34) through which fresh air and room air passes for the transfer of heat between a first (18/35) and second path (20/36) of the heat exchanger (34). The first path (18/35) delivers air to a first coil (25/38) to be heated or cooled thereby, while the second path (20/36) is delivered to a further coil (33/39) to be heated or cooled thereby. Air passing through the first coil (25/38) is delivered to the exterior while air passing through the second coil (23/39) is delivered to the interior of the room.

9 Claims, 3 Drawing Sheets

AIR CONDITIONING APPARATUS

TECHNICAL FIELD

The present invention relates to air conditioning systems.

BACKGROUND OF THE INVENTION

Considerable effort is made to improve the efficiency of air conditioning systems due to the considerable energy they consume, particularly in the case of large buildings.

Despite the above mentioned efforts known air conditioning systems still consume considerable power and therefore are costly to run.

The above discussed problem is addressed by the air conditioning system described in international patent application PCT/AU 01/00273 (WO 01/69154). Although the air conditioning system described in this international patent application goes some way to addressing the above problem, some improvements can be made.

OBJECT OF THE INVENTION

It is the object of the present invention to overcome or substantially ameliorate at least one of the above disadvantages.

SUMMARY OF THE INVENTION

There is firstly disclosed herein an air conditioning apparatus including;
a first and a second air inlet;
a heat exchanger having a first air path and a second air path, the first air path communicating with said first air inlet so as to receive air therefrom, said second air path communicating with said second air inlet so as to receive air therefrom, the air path being adjacently located so as to provide for heat transfer between air passing along the paths;
a first heat exchanger coil through which a refrigerant flows to cool or heat the first coil, said first coil being in communication with said second air path so as to receive air therefrom to cool or heat air passing through the first coil; and
a second heat exchanger coil through which the refrigerant passes to cool or heat the second coil, the second coil being in communication with the first air path so as to receive air therefrom so that air passing through the second coil is heated or cooled thereby; and wherein the first and second coils are part of a refrigeration cycle such that when said first coil is heating air, said second coil is cooling air, while when said first coil is cooling air said second coil is heating air.

Preferably, said heat exchanger is an enthalpy heat exchanger so that heat and moisture is transferred between air passing along the two paths.

Preferably, said first air inlet is adapted to take air from within a room while said second air inlet is adapted to take fresh air, with air passing along said first path being exhausted while air passing along said second path is to be delivered to said room.

Preferably, said apparatus includes a third air inlet, said third air inlet being in communication with said first coil so as to deliver air thereto, said third air inlet being adapted to receive fresh air.

In an alternative embodiment, preferably the air conditioning apparatus further includes;
a first evaporative cooler, said evaporative cooler communicating with said first inlet so that air from said first inlet passes through the evaporative cooler to be delivered to said first path; and wherein
said heat exchanger is a sensible heat exchanger.

Preferably, said first coil is an evaporative coil through which the refrigerant pass to cool the first coil so that air from said second air path passes through said evaporative coil to be cooled thereby; and
said second coil is a condenser coil through which the refrigerant passes to heat the condenser coil so that air passing through the condenser coil is heated thereby, and therefore cool the condenser coil.

Preferably, a fan is located between said heat exchanger and said evaporative coil to cause air to flow from said second air inlet to said evaporative coil.

Preferably, a further fan is located between said heat exchanger and said condenser coil to cause air to pass from said first inlet to said condenser coil.

Preferably, an evaporative cooler is located between said heat exchanger and said condenser coil.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
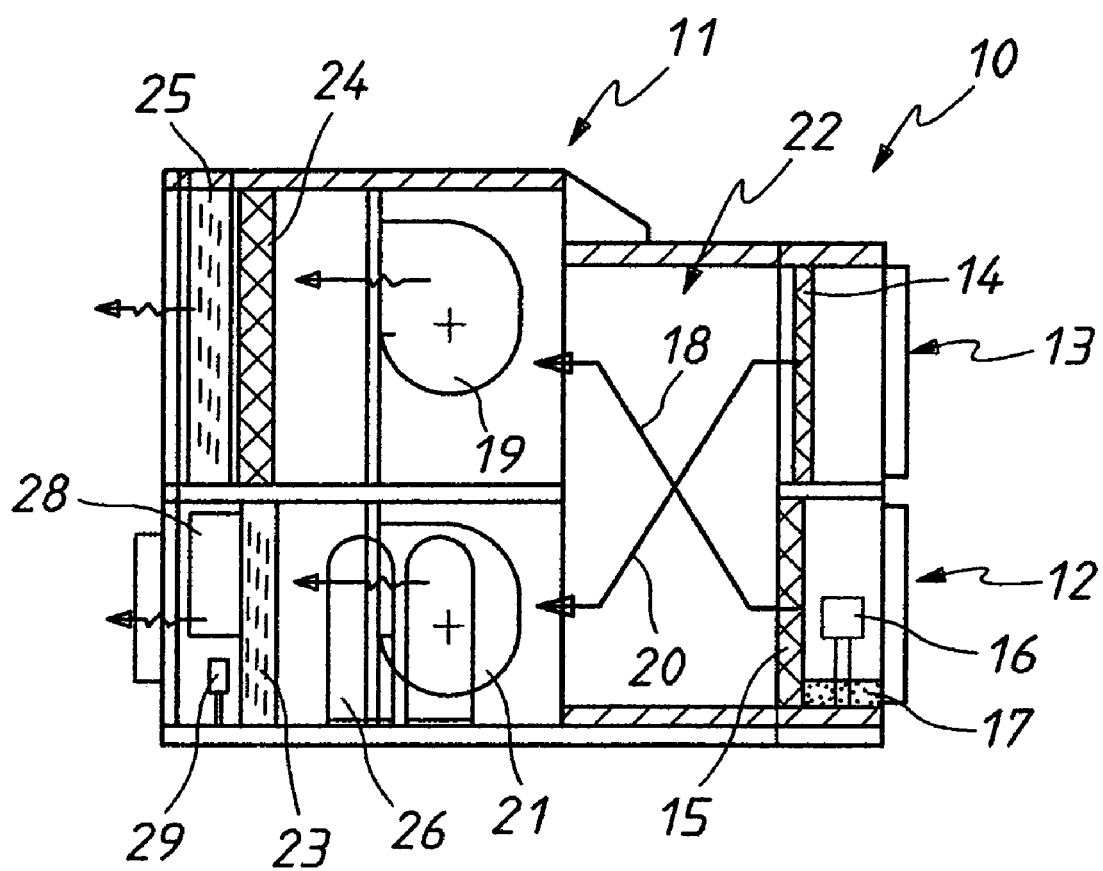
FIG. 1 is a schematic section side elevation of an air conditioning apparatus.
Figure 2:
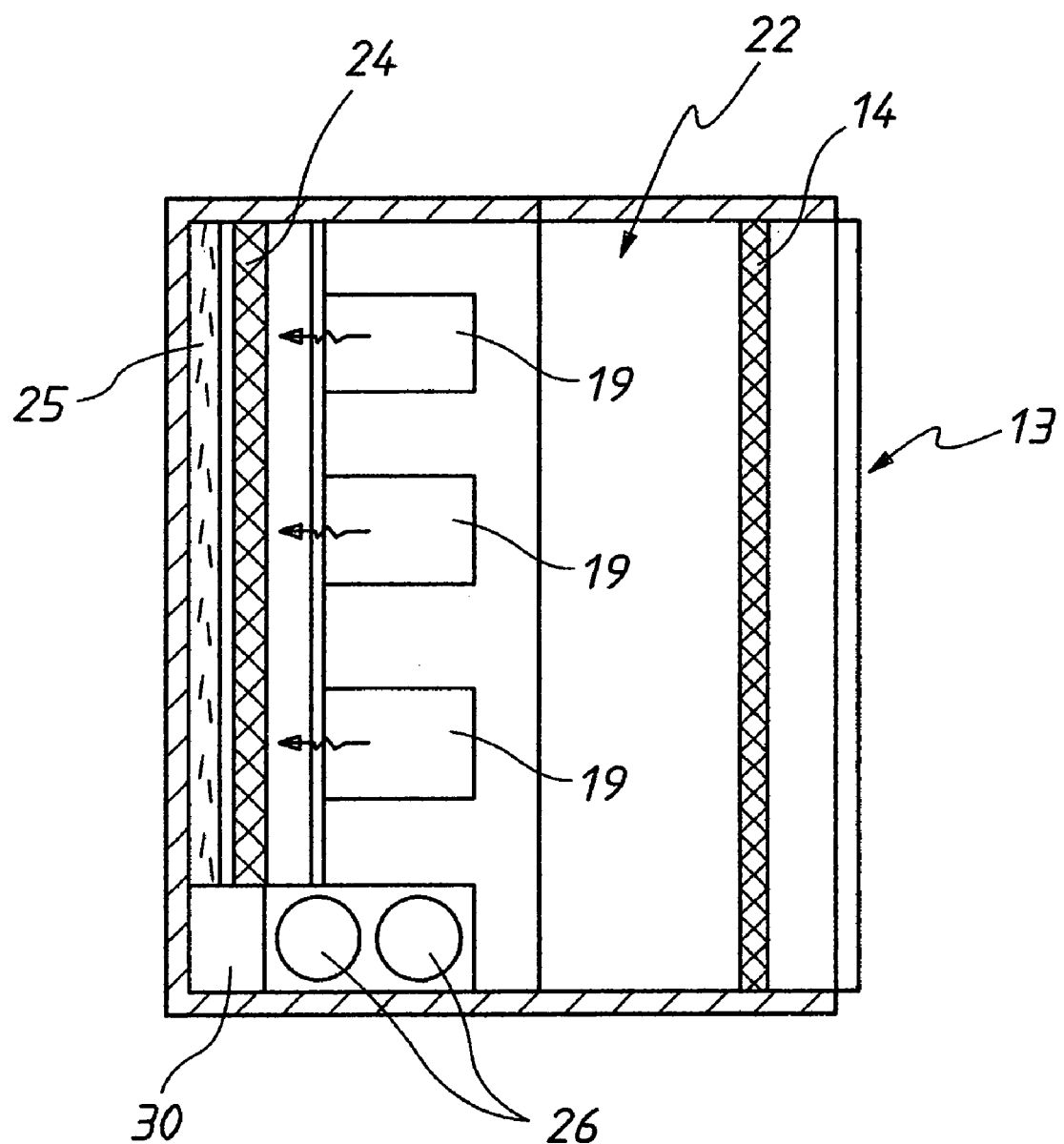
FIG. 2 is a schematic top plan view of the apparatus of FIG. 1.

In FIGS. 1 and 2 of the accompanying drawings there is schematically depicted an air conditioning apparatus 10. The apparatus 10 includes an outer housing 11 providing a first air inlet 12 and a second air inlet 13. The first air inlet 12 receives air from within an associated building, while the second air inlet 13 receives outside air. A filter 14 is located in the inlet 13 while located in the inlet 12 is a first evaporative cooler 15. The evaporative cooler 15 is a pad to which water is delivered via a pump 16 drawing water from a reservoir 17. Air passing through the first evaporative cooler 15 is cooled and humidified.

The air from the first evaporative cooler 15 passes along a first path 18 to a fan or fans 19. The air from the second inlet 13 and therefore filter 14 is delivered to a second path 20, which second path 20 delivers the air to a fan or fans 21.

The paths 18 and 20 are paths of a sensible heat exchanger 22. That is the heat exchanger 22 allows heat transfer without moisture transfer between the two paths 18 and 20. For example the heat exchanger 22 maybe a heat exchanger as disclosed in international patent application PCT/AU 01/00273 (WO 01/69154).

Air from the fan 21 is delivered to an evaporative coil 23 through which refrigerant passes. More particularly, the refrigerant undergoes a phase change and expands in the coil 23 so as to cool the coil 23. Accordingly, air from the fan 21 after passing through the coil 23 is cooled thereby.

Air from the fans 19 passes through a second evaporative cooler 24. From the evaporative cooler 24 the air passes through a condenser coil 25. The condenser coil 25 receives a refrigerant that condenses within the coil 25 to heat the coil 25. Accordingly, air passing through the condenser coil 25 is heated by the condenser coil 25, thus the coil 25 is cooled as heat is withdrawn therefrom.

Air exiting from the evaporative coil 23 is delivered to the interior of an associated building while the air exiting from the condenser coil 25 is delivered to the exterior.

Typically the evaporative (cooling) coil 23 and condenser (heating) coil 25 are linked so they are part of a refrigeration cycle.

Preferably, the air leaving the cooling coil 23 condenses water to be pumped to evaporative cooler 24 to pre-cool condenser coil 25. A reservoir 28 is included and may communicate with a mains water supply. A float in the reservoir 28 would regulate water level within the reservoir 28. Associated with the reservoir 28 is a pump 29 that would collect water coming from the cooling coil 23 and deliver it to the evaporative cooler 24. The water from the cooling coil 23 may be supplemented by a main supply where required via reservoir 28.

Associated with the cooling coil 23 and heating coil 25 are compressors 26 and associated controls 30 to cause a refrigerant to circulate through the coils 23 and 25 in a typical refrigeration cycle manner.

In a particular example air entering the inlet 12 may be 25 degrees (dry bulb) and 16 degrees (wet bulb). Air entering the inlet 13 maybe 40 degrees (dry bulb) and 21 degrees (wet bulb). Accordingly, air passing along the path 18 is heated by the air passing along the path 20. However, the air passing along the path 20 does not absorb any moisture from the air passing along the path 18. In such an instance air being delivered to the fan 21 may have a humidity of about 60%, a dry bulb temperature of 21.3 degrees and a wet bulb temperature of about 16.5 degrees. Air being delivered to the fan 19 would have a dry bulb temperature of about 36 degrees. Accordingly the air leaving the coil 23 and being delivered to the interior of the building is further cooled and dehumidified before entering the building.

In the above described construction heat absorbed by the coil 23 is dissipated through the coil 25, with the demand on the refrigeration cycle, of which the compressor 26 and coils 23 and 25 are part of, being minimised by the evaporative cooler 24.

Typically the above apparatus 10 would be a roof top package unit that delivers up to 100% fresh air to the interior of the building. In respect of the fans 19 and 21 it should be appreciated that they may be placed at any required location along the various air paths, all that is required is that there be a pressure differential to cause air flow through the apparatus 10.

The performance of the apparatus 10 is enhanced by having the evaporative cooler 24 before the heating coil 25. This arrangement increases the amount of heat rejected by the heating coil 25, thus increasing overall performance of the system.

The above apparatus 10 is further enhanced by the heat exchanger 22. The heat exchanger 22 is preferably a "counter flow heat exchangers" such as that described in the above mentioned international patent application PCT/AU 01/00273. That is air passing along the second path 20 transfers its heat energy to the air passing along the path 18, which air is ultimately delivered to the exterior.

Figure 3:
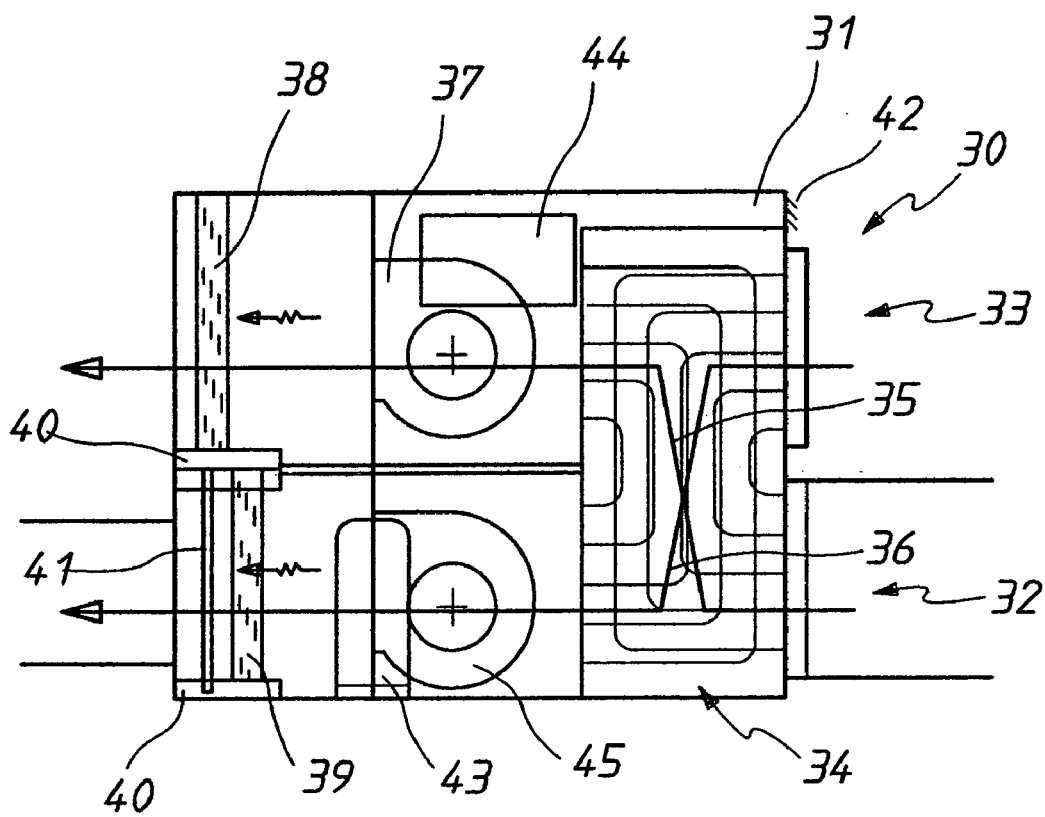
FIG. 3 is a schematic side elevation of a further air conditioning apparatus.
Figure 4:
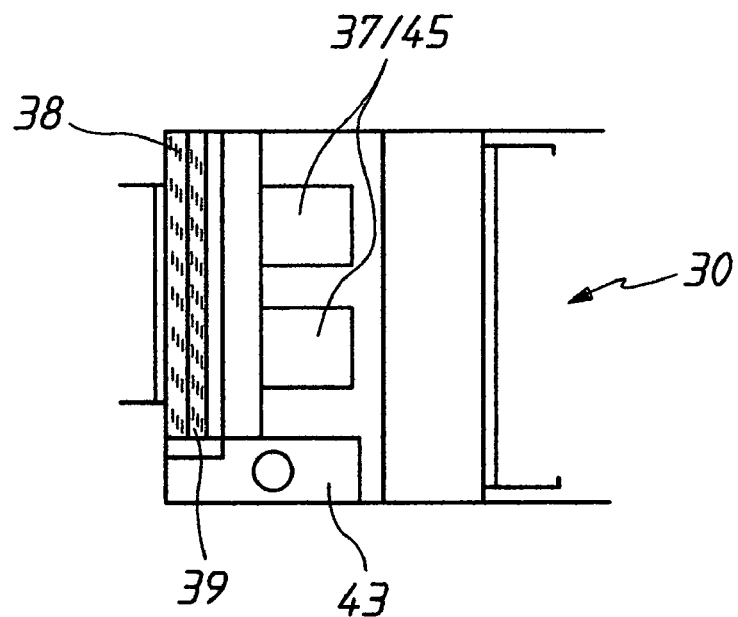
FIG. 4 is a schematic top plan view of the apparatus of FIG. 3.

In FIGS. 3 and 4 of the accompanying drawings there is schematically depicted air conditioning apparatus 30. The apparatus 30 includes an outer housing 31 providing a first air inlet 32 and a second air inlet 33. The first air inlet 32 receives air from within an associated building or room, while the second air inlet 33 receives outside air (fresh air). The inlet 33 may include a filter.

Located internally of the housing 31 is an enthalpy heat exchanger 34. The heat exchanger 34 may be constructed in a similar manner to that disclosed in International Application PCT/AU01/00273. The heat exchanger 34 includes a first air path 35 and a second air path 36. The air path 35 receives air from the inlet 32 while the path 36 receives air from the inlet 33. As the heat exchanger 34 is an enthalpy heat exchanger with the two paths 35 and 36 adjacently located, heat and moisture is transferred between the air passing along the two paths 35 and 36.

The first path 35 delivers air to one or more fans 37 that delivers air to a first heat exchanger coil 38. Refrigerant passes through the coil 38 to cool or heat the coil 38 so as to intern cool or heat the air passing therethrough. Air leaving the coil 38 is delivered to the exterior of the building or room.

The path 36 delivers air to one or more fans 45 that provides air for a second heat exchanger coil 39. A refrigerant passes through the coil 39 to heat or cool the coil 39 to intern heat or cool air passing therethrough from the fan 38. Air leaving the coil 39 is delivered to the interior of the room or building communicating with the inlet 32.

Associated with each coil 38 and 39 is a tray 40 that collects condensate, with a tube 41 extending from the upper tray 40 to the lower tray 40 to provide for the flow of water therebetween.

In operation of the above described apparatus 30, the coils 38 and 39 are part of a refrigeration apparatus (cycle) in which when one of the coils 38 or 39 is operating as an evaporative coil, the other coil 38 or 39 is operating as a condenser coil.

Preferably the apparatus 30 includes a third air inlet 42 that receives fresh air and delivers the fresh air to the fan 37.

In the above apparatus 30, preferably there is contained within the housing 31 a scroll compressor 43 and an electric compartment 44 that has the control apparatus for the refrigeration apparatus and fans 37 and 38.

In a particular example, air entering the inlet 32 may have a drive bulb temperature of 24° C. and a wet bulb temperature of 17° C. The inlet 33 has air at a dry bulb temperature of 35° C. and wet bulb temperature of 24° C. Air entering the room from the path 36 would have a dry bulb temperature of about 13° C. and wet bulb temperature of approximately-12.5° C. Air being exhausted via the path 35 would have a dry bulb temperature of approximately 40° C. and a wet bulb temperature of approximately 25° C.

What is claimed is:

1. There is firstly disclosed herein an air conditioning apparatus including;
    a first and a second air inlet;
    a heat exchanger having a first air path and a second air path, the first air path communicating with said first air inlet so as to receive air therefrom, said second air path communicating with said second air inlet so as to receive air therefrom, the air path being adjacently located so as to provide for heat transfer between air passing along the paths;
    a first heat exchanger coil through which a refrigerant flows to cool or heat the first coil, said first coil being in communication with said second air path so as to receive air therefrom to cool or heat air passing through the first coil; and
    a second heat exchanger coil through which the refrigerant passes to cool or heat the second coil, the second coil being in communication with the first air path so as to receive air therefrom so that air passing through the second coil is heated or cooled thereby; and wherein the first and second coils are part of a refrigeration cycle such that when said first coil is heating air, said second coil is cooling air, while when said first coil is cooling air said second coil is heating air.

2. The apparatus of claim 1 wherein, said heat exchanger is an enthalpy heat exchanger so that heat and moisture is transferred between air passing along the two paths.

3. The apparatus of claim 1 wherein, said first air inlet is adapted to take air from within a room while said second air inlet is adapted to take fresh air, with air passing along said first path being exhausted while air passing along said second path being provided to be delivered to said room.

4. The apparatus of claim 1 wherein, including a third air inlet, said third air inlet being in communication with said first coil so as to deliver air thereto, said third air inlet being adapted to receive fresh air.

5. The air conditioning apparatus of claim 1 further including;

a first evaporative cooler, said evaporative cooler communicating with said first inlet so that air from said first inlet passes through the evaporative cooler to be delivered to said first path; and wherein said heat exchanger is a sensible heat exchanger.

6. The apparatus of claim 5 wherein, said first coil is an evaporative coil through which the refrigerant pass to cool the first coil so that air from said second air path passes through said evaporative coil to be cooled thereby; and said second coil is a condenser coil through which the refrigerant passes to heat the condenser coil so that air passing through the condenser coil is heated thereby, and therefore cool the condenser coil.

7. The apparatus of claim 6 further including a fan located between said heat exchanger and said evaporative coil to cause air to flow from said second air inlet to said evaporative coil.

8. The apparatus of claim 6 further including a fan located between said heat exchanger and said condenser coil to cause air to pass from said first inlet to said condenser coil.

9. The apparatus of claim 6 further including an evaporative cooler located between said heat exchanger and said condenser coil.

* * * * *

UNITED STATES PATENT AND TRADEMARK OFFICE
CERTIFICATE OF CORRECTION

PATENT NO. : 6,935,132 B1
DATED : August 30, 2005
INVENTOR(S) : John Francis Urch It is certified that error appears in the above-identified patent and that said Letters Patent is hereby corrected as shown below:

Column 5,
Line 7, after "air" (first occurrence) insert -- , --.

Column 6,
Line 5, change "pass" to -- passes --.
Line 11, change "cool" to -- cools --.

Signed and Sealed this

Twentieth Day of December, 2005

JON W. DUDAS
*Director of the United States Patent and Trademark Office*